(12) United States Patent
Šuppa et al.

(10) Patent No.: US 12,430,912 B2
(45) Date of Patent: Sep. 30, 2025

(54) AUDIENCE RE-ENGAGEMENT DURING LARGE ONLINE MEETINGS

(71) Applicant: Cisco Technology, Inc., San Jose, CA (US)

(72) Inventors: Marek Šuppa, Bratislava (SK); Andrej Švec, Bratislava (SK); Andrej Baran, Bratislava (SK); Tomas Sirny, Bernolakovo (SK)

(73) Assignee: CISCO TECHNOLOGY, INC., San Jose, CA (US)

( * ) Notice: Subject to any disclaimer, the term of this patent is extended or adjusted under 35 U.S.C. 154(b) by 228 days.

(21) Appl. No.: 17/991,036

(22) Filed: Nov. 21, 2022

(65) Prior Publication Data

US 2024/0169724 A1    May 23, 2024

(51) Int. Cl.
    *G06V 20/40*    (2022.01)
    *G06V 40/16*    (2022.01)
    *H04L 12/18*    (2006.01)

(52) U.S. Cl.
    CPC ............ *G06V 20/41* (2022.01); *G06V 40/161* (2022.01); *H04L 12/1831* (2013.01)

(58) Field of Classification Search
    CPC ...... G06V 20/41; G06V 40/161; G06V 20/40; G06V 40/16; H04L 12/1831; H04L 12/1827; H04L 12/1822; H04L 12/18
    See application file for complete search history.

(56) References Cited

U.S. PATENT DOCUMENTS

| | | | |
|---|---|---|---|
| 10,097,888 B2 | 10/2018 | Srinivasan et al. | |
| 2015/0154291 A1 | 6/2015 | Shepherd et al. | |
| 2016/0073054 A1 | 3/2016 | Balasaygun et al. | |
| 2020/0153915 A1* | 5/2020 | Jain | H04L 67/535 |
| 2022/0215341 A1* | 7/2022 | Crawford | H04L 67/55 |

OTHER PUBLICATIONS

Meeting Culture, "Measure your meetings with the Meeting Engagement Score™," https://www.meetingdecisions.com/blog/meeting-engagement-score, retrieved Sep. 5, 2022, 7 pages.

* cited by examiner

Primary Examiner — Yosef K Laekemariam

(74) Attorney, Agent, or Firm — Edell, Shapiro & Finnan, LLC

(57) ABSTRACT

In an online meeting, activities of participants of the online meeting are monitored. An overall level of participant engagement of the participants is determined during the online meeting. In response to a determination that the overall level of participant engagement is at or beyond a threshold, an interaction element can be introduced for all participants in the online meeting. In an example embodiment, the interaction element can comprise a poll provided to all participants attending the online meeting.

22 Claims, 10 Drawing Sheets

AUDIENCE RE-ENGAGEMENT DURING LARGE ONLINE MEETINGS

TECHNICAL FIELD

The present disclosure relates to online meetings.

BACKGROUND

During online meetings, particularly online meetings including a large number of participants (e.g., at least twenty, or even as many as 100 participants or 1000 participants or more), participants tend to be passive and not actually participate in the meeting and/or become distracted with other activities (e.g., online web browsing, reviewing other applications or documents on the user's device, etc.). This can pose a problem for the meeting host, organizer and/or presenter, particularly when significant resources are invested to ensure a meeting is engaging and time well spent for attending participants.

DETAILED DESCRIPTION

Overview

In an example embodiment, a method comprises monitoring activities of participants attending an online meeting, determining an overall level of participant engagement of the participants during the online meeting, and, in response to a determination that the overall level of participant engagement is at or beyond a threshold, facilitating an interaction element to be introduced for all participants in the online meeting.

Example Embodiments

In accordance with example embodiments described herein, a level of engagement by participants attending an online meeting is determined in real time (i.e., in an ongoing basis or during the online meeting). The level of engagement can be determined based upon a level of inactivity or idleness by participants (e.g., determination of an idleness score). Based upon the level of engagement (or lack thereof) reaching, meeting or extending beyond a selected threshold, an audience interaction element can be implemented (e.g., automatically implemented or suggested to a meeting host or presenter for implementation to the entire participant group) for the online meeting in an effort to increase the level of engagement by participants during the meeting.

Figure 1:
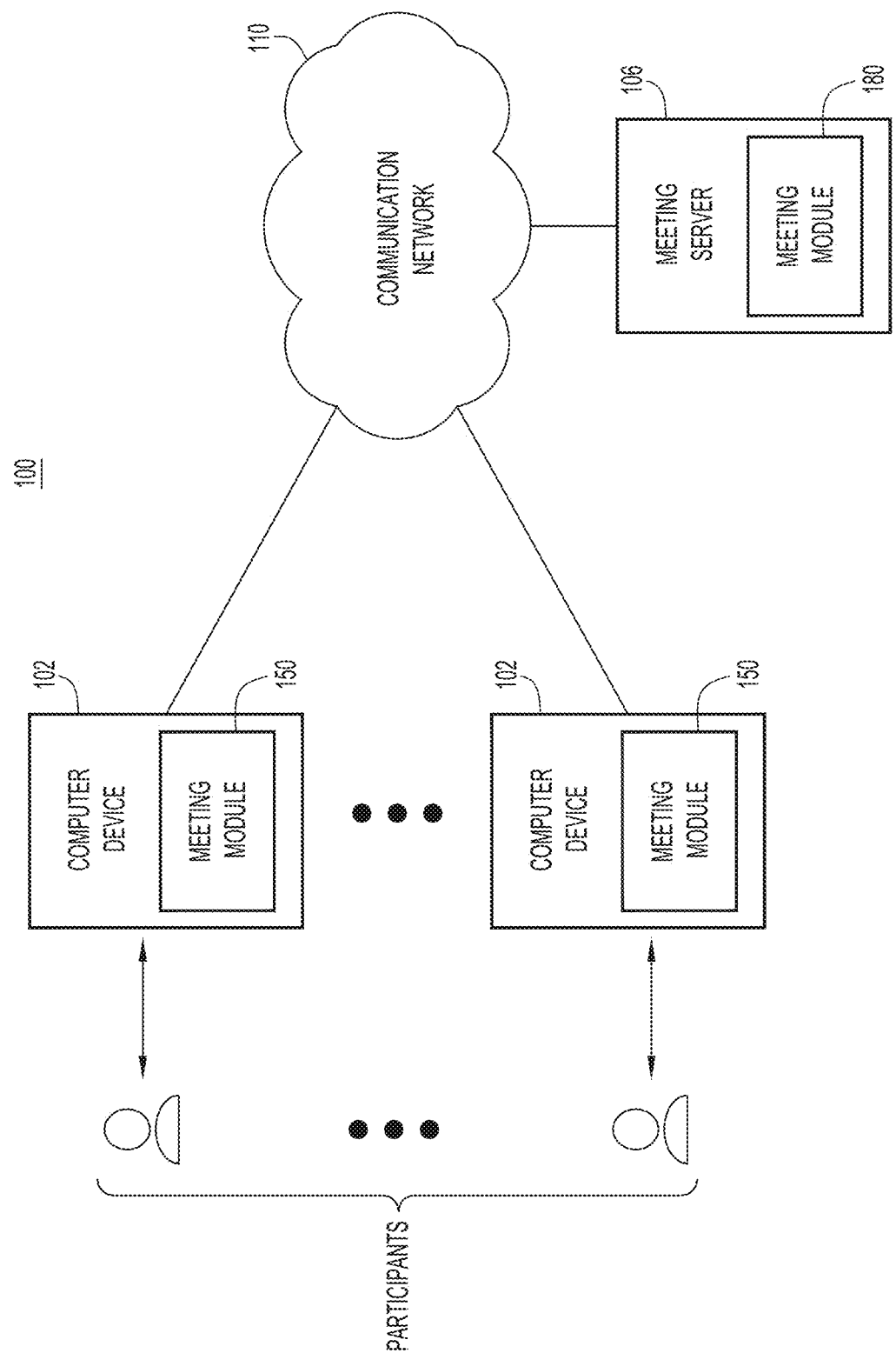
FIG. 1 is a block diagram of a system that facilitates an online meeting environment in accordance with an example embodiment.

Referring to FIG. 1, an example system environment 100 for an online meeting environment is depicted, in which computing devices 102 (also referred to herein as participant devices) are operated by local users or participants that engage in the online meeting, and a supervisor or online meeting server 106 is provided to host or support the online meeting (e.g., web-based or over a network) as described herein. The computing devices 102 and meeting server 106 communicate via a communication network 110. The computing devices 102 of users/participants can comprise any suitable device capable of transmitting and receiving audio and/or visual content including, without limitation, desktop computers, laptop computers, tablets, mobile devices such as PDAs and cellular phones/smart phones, and video conferencing endpoints (e.g., video conferencing rooms). The meeting server 106 can be any one or more suitable computing devices including online conferencing tools as described herein to support or host online meetings for any selected number of computing devices 102.

The communication network 110 can include one or more wide area networks (WANs), such as the Internet, and one or more local area networks (LANs). Computing devices 102 can communicate with each other, and with the online meeting server 106, over communication network 110 using a variety of known or hereafter developed communication protocols. For example, the computing devices 102 and meeting server 106 may exchange Internet Protocol (IP) data packets, Realtime Transport Protocol (RTP) media packets (e.g., audio and video packets), and so on.

Each computing device 102 that connects with or engages in an online meeting over the network 110 includes a meeting module 150 that comprises one or more software applications (e.g., one or more meeting applications) that facilitate connection with other computing devices and operation in the online meeting platform that is hosted by the meeting server 106. Thus, each participant attends the online meeting when the computing device of the participant connects with or engages in the online meeting. Each computing device 102 can further include any other suitable software applications and related documents including, without limitation, word processing applications, spreadsheet applications, slide deck and/or other presentation applications, applications supporting formats such as PDF, JPEG, MPEG, etc., internet web browsing applications, etc.

In a conventional manner, each computing device 102 can support the operation of any selected number of applications at the same time (e.g., having a word processing document open and operable, a PDF document open and operable, a MPEG document open and operable, and a web browsing application open and operable, all open and operable together or at the same time). The one or more software applications of the meeting module 150 can also be open and operable at each computing device 102 at the same time as any one or more software applications stored at or accessible by each computing device. Thus, the computing device 102 of each participant engaged in an online meeting can have one or more other software applications open and operable while the participant engages in the online meeting hosted and supported by the meeting server 106.

Figure 2:
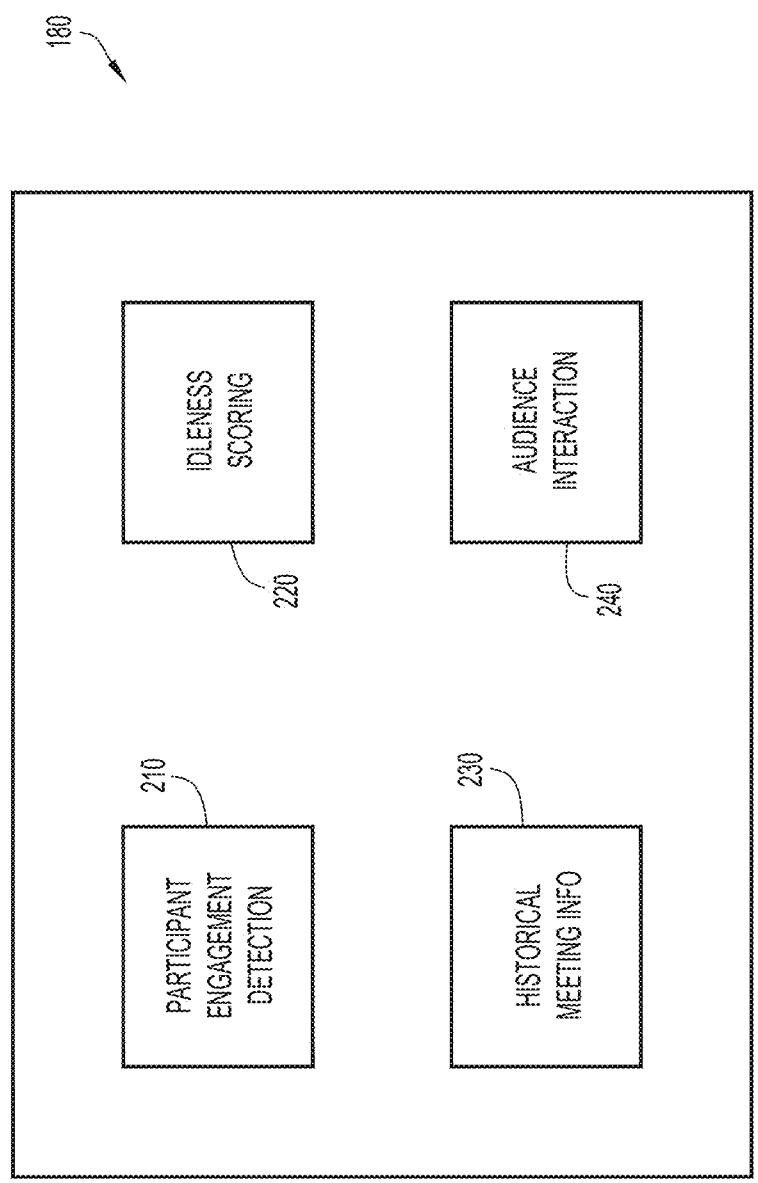
FIG. 2 is a block diagram depicting a meeting module for a meeting server that supports an online meeting in accordance with the example embodiment of FIG. 1.

The meeting server 106 includes a meeting module 180 comprising one or more software applications that facilitate and/or support operations of various features during an online meeting. Referring to FIG. 2, an example embodiment of the meeting module 180 for the meeting server 106 includes a Participant Engagement Detection tool 210, an Idleness Scoring tool 220, Historical Meeting Information database 230, and an Audience Interaction tool 240. Each tool comprises one or more software applications (or references specific operations or features of one or more software applications of the meeting module 180) that facilitate detection of participant engagement in an online meeting and providing some indication of participant engagement as well as the introduction of an audience interaction element to the online meeting based upon idleness determination. The storage refers to a memory storage medium for storage of information associated with online meetings as described herein.

The Participant Engagement Detection tool 210 operates to facilitate monitoring by the meeting server 106 of activities of participants during their engagement in the online meeting. Monitoring can include activities of participants directly within the online meeting. For example, one or more computing devices 102 engaged in a meeting can be monitored by the meeting server 106, via tool 210, to detect the following periodically during the online meeting: whether audio of computing device or meeting is turned on or off (audio off might indicate a lower level of engagement of the participant in the meeting), whether video/camera of computing device is turned on or off (camera turned off might indicate a lower level of engagement of the participant in the meeting), most recent interaction with the video presentation window of the meeting user interface for the computing device (e.g., determine whether presentation window is in foreground or background of display for computing device).

In addition, the online meeting may support, via features of the user interface for the online meeting, instant messaging and/or online chats between participants while the meeting is ongoing. The meeting server 106, using tool 210, can monitor when participants are messaging or chatting with other participants during the meeting and use such information to determine a level of engagement of participants within the meeting. Other features that allow participants to actively engage in a meeting, such as emoji buttons that allow participants to add an emoji for other participants to see within a meeting (e.g., smiley face, frowning face, etc.), can also be monitored and used by the meeting server to determine a level of engagement of participants in the meeting. For example, when a participant adds a smiley face emoji during the meeting, this may represent an indication that a participant is actively engaged or focused on current presentation content within the meeting.

Other types of monitoring by the meeting server (achieved utilizing the Participant Engagement Detection tool 210) can be based upon features or activities obtained from participant devices engaged in the online meeting. For example, the meeting server 106 can monitor face or facial detections from the video streams from one or more computing devices 102 (obtained by images captured by the cameras of the computing devices during a meeting). Facial detection can include detection of facial movements in the video streams to provide an indication of participant engagement during the meeting. For example, the tool 210 can include one or more facial detection software applications that detect a human face within the video stream generated by a camera of a computing device 102 for use in the online meeting (e.g., when a participant chooses to have their camera on during the meeting), where the face detection can detect whether the participant is staring or focusing on the monitor or display screen of the computing device that is displaying the online meeting (e.g., participant looking straight ahead in the video stream, can be detected based upon location of participant's eyes as identified in the facial detection) or staring away from the monitor or display screen of the computing device during the meeting (e.g., participant looking to side or head turned to side and not looking straight ahead in video stream, can be determined by identification of location and/or whether participant's eyes are identified from facial detection) or further whether the participant is even present within the video stream (e.g., participant may have stepped away from the computing device, so no facial detection occurs).

Utilizing the Participant Engagement Detection tool 210, facial detections of participants can occur for any selected number (e.g., one or more) of the computing devices 102 engaged in the online meeting. Utilizing the tool 210, a determination of "engaged" can be determined for a computing device 102 at any given time during the online meeting when it is detected that the participant is staring or focusing on the display of the meeting (i.e., staring straight ahead in views of video stream). In contrast, a determination of "not engaged" can be determined for a computing device at any given time during the meeting when the participant view is detected as being anything other than staring or focusing on the display of the meeting (e.g., staring away from straight ahead, participant head turned sideways away from display, or participant not in views of video stream which indicates participant is away from his or her computing device). Facial detection can be monitored or sampled utilizing the tool 210 at any selected time intervals for any number of computing devices 102 engaged in the meeting. For example, sampling of facial detection can be performed constantly for a select number of computing devices (e.g., some or all) during the meeting. Alternatively, facial detection sampling can occur at given time intervals (e.g., once every minute or every 30 seconds) of the online meeting. In scenarios in which there is a significantly large number of participants/computing devices engaged in the meeting (e.g., 100 or more computing devices associated with participants), a random sampling of participants can be selected (e.g., no greater than 50% of the computing devices, such as 25%) as representative of the entire group rather than performing facial detection monitoring of each computing device during the meeting.

While facial detection and movements during the online meeting can be helpful as a determination of participant engagement, it can be common for participants to turn their camera off such that the computing device of the participant does not provide video feed of the participant during the meeting (or during portions of the meeting). A camera off status for a computing device of a participant may not provide accurate information as to whether the participant is fully engaged in the online meeting. Accordingly, and unless the meeting requires each participant device to have its camera turned on, an accurate determination of an overall level of participant engagement in a meeting might require more than just facial detection of the video feed content by the participant devices.

Another manner in which participant engagement in the meeting can be detected during the online meeting comprises monitoring use of other applications at one or more of the computing devices during the online meeting. The meeting server 106, using tool 210, can be configured to communicate with participant devices to determine whether any other software applications (or any specific types of software applications) are currently running and/or actively being used on the participant devices during the online meeting. For example, utilizing tool 210, a computing device 102 that is engaged in the online meeting can be remotely monitored by the meeting server 106 to determine whether a web browsing application is open, running and further whether the participant is actively using the web browsing application (e.g., browsing web sites on the Internet) during the online meeting. In another example, the computing device 102 can be remotely monitored by the meeting server 106 and utilizing tool 210 to determine whether a word processing application, a spreadsheet application and/or any other type of application is open, running and currently being used by the participant during the online meeting. Other types of activities by the participant that are engaged in via the computing device 102 can also be remotely monitored during the online meeting, such as texting applications, phone calls, emails being opened and/or sent by the participant. In such activities involving communications that the participant may be engaged in that are separate from the online meeting (i.e., communications with someone other than participants attending the online meeting), the remote monitoring can be configured to only identify when applications supporting such communications are currently active or being utilized on the computing device 102 by the participant during the online meeting (i.e., when a phone call is ongoing, an email and/or text message is being generated based upon detection of keystroke entries and/or an email or text message has recently been sent, etc.), where it should be understood that the content of such communications would not or cannot be monitored and thus maintained private for the participant. In other words, the monitoring may be limited to whether or not a communication application on the participant's device is only open/running and also being actively used. Similar to facial detection, the meeting server 106 can monitor and detect use of such applications by a participant at a computing device 102 engaged in the online meeting continuously or at any selected intervals during the meeting. Further, depending upon the number of participants in the online meeting, each computing device engaged in the online meeting can be monitored or only a sampling of the computing devices can be monitored (e.g., no greater than 50%, e.g., about 25%) as representative of the entire group.

Other participant activities (or lack thereof) can also be monitored to determine an individual as well as an overall (i.e., entire group) level of participant engagement within the online meeting. For example, periodically, a meeting presenter might provide interactive content during the meeting, such as asking a question or even a series of questions presented in a poll (e.g., based upon presentation content) and allowing presenters to answer verbally or via a text response posted to the meeting group or the meeting presenter. The meeting server 106 (utilizing tool 210) can determine a response level by number or percentage of participants that answer the question and use this information to determine a level of engagement in the online meeting.

The meeting server can be configured to utilize any number (e.g., one or more) of different types of monitoring events associated with participant activities including, without limitation, the types previously described herein, in order determine a representation of a group level of engagement by participants in real time and in a continuous ongoing manner in the online meeting. Any one or any number of these monitoring events can be continuously monitored or selectively monitored over a select period of time (e.g., every 30 seconds) during the online meeting. Further, every participant in the online meeting can be monitored via their participant devices. Alternatively, a select number or sampling of participants (e.g., no more than 50%, or even 25% or less of the participants) can be monitored to represent a collective or group engagement level in the meeting.

The engagement information obtained from the monitoring events can be analyzed by the meeting server 106 to determine an idleness score on an individual participant level and/or a collective or entire meeting group level (i.e., an overall level of participant engagement). Thus, the idleness score represents a level of engagement in the meeting by one or more participants. For example, an idleness score can be determined such that an increasing value for the idleness score represents a higher level of non-engagement of one or more participants in the meeting (i.e., one or more participants not paying attention or distracted by other activities during the ongoing meeting). Accordingly, a decreasing or lower value for the idleness score represents an increased level of engagement of one or more participants in the meeting (e.g., participants becoming more focused or paying more attention to the ongoing meeting). An Idleness Scoring tool 220 of the meeting module 180, in operation by the meeting server 106 facilitates analyzing the monitoring event information to determine an idleness score during the online meeting. The idleness score can be determined utilizing tool 220 during the same or similar time intervals in which monitoring event information is obtained. In example embodiments, the idleness score can be determined every 20-30 seconds during the online meeting.

Any suitable one or more algorithms can be applied utilizing the Idleness Scoring tool 220 to determine an idleness score for an individual participant as well as a collective or group score and based upon the engagement monitoring event information determined utilizing tool 210. In scenarios in which more than one engagement monitoring event is determined, a weighting of each monitoring event can be applied to determine the idleness score. For example, when monitoring facial detection in combination with monitoring of whether audio is turned off and also one or more other applications running and being actively used on a computing device 102 engaged in the online meeting, a detection of another application running and being used on the computing device (e.g., participant is working on a word processing document) might be weighted a smaller amount or to a smaller degree in comparison to a facial detection by participant of not staring directly at display screen (e.g., participant is looking away from display or further still not present in the video stream from the camera of the computing device) and further still a detection that audio for the online meeting is turned off by the computing device (indicating participant may not be listening to audio content from the online meeting). Based upon the weighting of each monitored event during the online meeting, an overall score on a selected scale (e.g., 1-100) can be determined. The idleness score can be determined for one or more participants on an individual level, and then a group score can be obtained by normalizing the values obtained for the individual participant scores (e.g., obtaining an average value or mean value of the determined participant idleness scores which is representative of the level of idleness for the entire group). Thus, the overall idleness score can be determined as a single score that is based upon a plurality of individual participant idleness scores.

As previously noted, the meeting server 106, utilizing tools 210 and 220, can monitor every participant device or, alternatively, a select number of participant devices (e.g., 50% or less, such as 25% of all computing devices) engaged in the online meeting. Selection of which computing devices 102 to monitor in order to obtain information for idleness scores can be based upon historical information from previous meetings which include a substantial number of the same participants as in the current ongoing meeting. For example, in a large corporate environment in which monthly online meetings are scheduled for large divisions or groups within the corporation or even in which the entire employee roster attends the meetings (could be 100+ or even 1000+ participants in each online meeting), there might be certain participants that historically trend with idleness scores that are higher than the average or group idleness scores for such meetings. Such participants can be selected as part of the sampling group to determine an overall idleness score during a current online meeting. Historical meeting information, including information about which participants might be included for determining an overall idleness score for the entire group during an online meeting, can be stored in the Historical Meeting Information database 230 and accessible by the meeting server 106 during online meetings.

The idleness score determined for the entire group of participants can be considered an overall idleness score for the online meeting. This overall idleness score can be shared with the presenter and/or an administrator or host of the meeting on a real time basis so that an indication of how the meeting is being received and level of attention by the participants is made known. This can allow the presenter to make changes or modify the presentation in an attempt to better capture the attention and engagement of the participants in the meeting. An idleness score can further be provided to the meeting presenter continuously in the user interface of the online meeting (see, e.g., the idleness meter depicted in the user interfaces of FIGS. 4-6).

The overall idleness score can also be used to determine whether some form of re-engagement feature might be implemented during the meeting. The meeting module 180 of the meeting server 106 includes an Audience Interaction tool 240 that facilitates operation by the meeting server to recommend (e.g., to the meeting presenter) and/or provide one or more types of interaction elements to the entire group of participants in the online meeting when the overall idleness score or extends beyond a predetermined threshold (e.g., increases to a value that is at or above an undesirable value in the idleness score scale or, alternatively, decreases to a value that is at or below an undesirable value in the idleness score scale). Non-limiting examples of interaction elements that can be introduced into the meeting include introducing a poll within the online meeting to participants requesting answers to one or more questions, providing a change in background of user interface to re-direct participant focus to the display of ongoing meeting content, providing an indication within the online meeting that a break in the meeting will occur until participant attention changes the overall idleness score to a desired threshold value, etc.

In example embodiments in which the overall idleness score increases as participants become less attentive/more idle during the meeting, the meeting server (utilizing tool 240) can recommend an interactive poll of one or more questions to the meeting host to be submitted during the meeting when the overall idleness score reaches and/or extends beyond (e.g., exceeds) a threshold value. In response to a recommended poll being chosen, the poll can automatically be integrated within the online meeting, e.g., as a pop-up window within the user interface of the online meeting that is viewed by all participants of the meeting. The pop-up window can include a question to be answered by each participant. This can have the effect of directing participants who may have been idle or non-engaged/inattentive back to and re-engaging with the online meeting. This can further have the effect of decreasing the overall idleness score. For example, providing a poll can cause participants to direct their faces and gaze back toward the display and the user interface of the meeting, or cause participants to cease any text, email or phone communication and focus back on the meeting, or causing participants to cease web browsing and/or operation within another software application (such as a word processing document) and re-focus on the meeting, etc. This in turn will result in a lowering of the overall idleness score. In another example, in response to an overall idleness score reaching and/or exceeding a threshold value, color and/or other visual features of the user interface of the meeting can be modified to re-direct participant attention back to the meeting. Changing visual features of the user interface for the online meeting can include color changes or addition of icons or other images within the user interface (e.g., introduction of red or other bright color to the user interface, flashing colors and/or flashing images provided in the user interface, etc.). In a further example, the meeting server can recommend that the meeting host take a break in the meeting and then provide an automatic countdown timer (e.g., 5 minutes) that allows participants to potentially re-focus on the meeting after the countdown timer expires.

Interaction elements that can be recommended and/or implemented by the meeting server can also be selected for a specific meeting or for a specific group of participants attending the meeting with their computer devices and/or based upon further information accessible from the Historical Meeting Information database 230. For example, information from a previous meeting can be referenced by the meeting server 106 during an ongoing meeting, in which a particular type of interaction element (e.g., a specific type of poll with one or more specific questions) was determined to achieve a certain level of success in re-engagement of participants with the previous meeting (based upon a change in the overall idleness score, e.g., overall idleness score decreased to a value below a predetermined threshold value) in response to implementation of the interaction element. The same or similar interaction element could be recommended and/or introduced during the current ongoing meeting when the overall idleness score reaches a value that would trigger such event. In addition, historical data regarding how well one or more previous interaction elements resulted in re-engaging a specific group of participants (e.g., same group of employees from a business or organization) with a previous ongoing meeting can be made available to the meeting server to suggest the same one or more previous interaction elements in a current ongoing meeting with the same specific group of participants (e.g., when the overall idleness score is at or exceeds a threshold value). In still other examples, meetings can be categorized based upon meeting content (e.g., financial forecasting meeting, real estate sales group meeting, engineering R&D meeting, etc.), where the group of participants may have similar goals, work responsibilities, etc. A meeting content descriptor assigned to a meeting can be obtained, e.g., from meeting invite information (where the meeting is defined in the meeting invitation to participants) and/or defined directly by the presenter (e.g., meeting presenter provides or selects from a specified list a specific meeting category that is then assigned to the meeting). The Historical Meeting Information database 230 can store information regarding successful types of interaction elements that have been used for specific categories or types of meetings.

Figure 3:
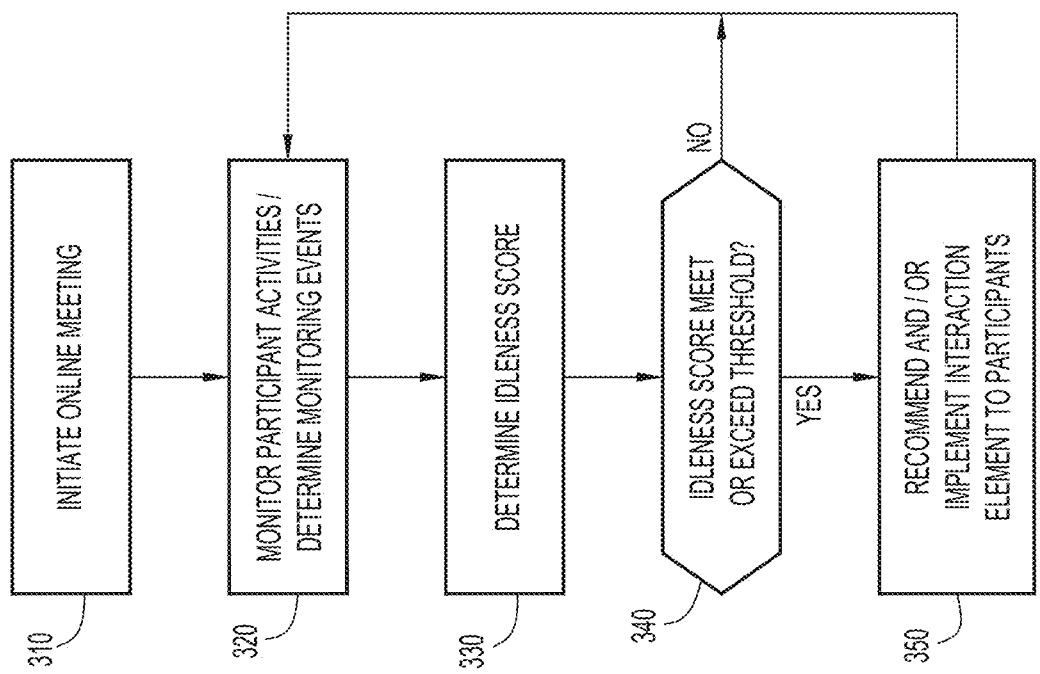
FIG. 3 is a flowchart depicting a method for assessing a current level of audience engagement of participants in an online meeting and re-engaging or increasing the level of audience engagement during the online meeting in accordance with an example embodiment and utilizing the system of FIG. 1.

An example embodiment of an online meeting in which overall idleness score is determined and monitored and an audience interaction element is recommended and implemented is now described with reference to the flowchart of FIG. 3 and the user interface depictions of FIGS. 4-6. At 310, an online meeting is initiated in which a plurality of participants each connect, via a computing device 102 of each participant, with the online meeting which is hosted by the meeting server 106. Upon connection with the online meeting by the computing device 102 of a participant, the display of the computing device includes a user interface that facilitates operations by the participant such as turning on/off camera (for sharing of video stream content by the camera of the participant's device in the online meeting), turning on/off microphone (for sharing of audio stream content by the microphone of the participant's device in the online meeting), sharing of content from the participant's device, etc. The user interface for the online meeting can further display to each participant content shared by the meeting presenter at the computing device of the presenter.

Figure 4:
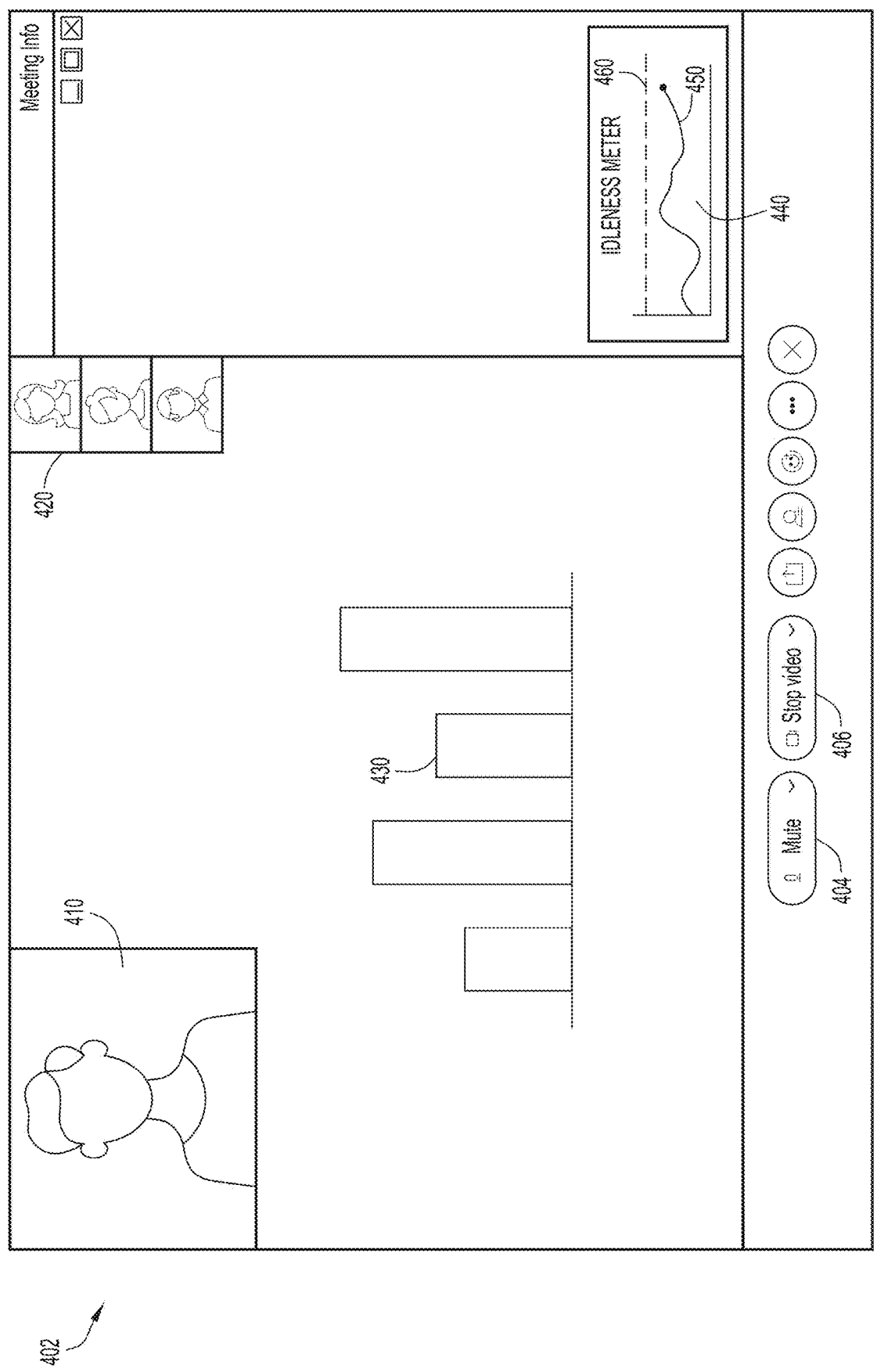
FIG. 4 depicts a user interface for a participant/presenter during an online meeting in accordance with an example embodiment and utilizing the system of FIG. 1.
Figure 5:
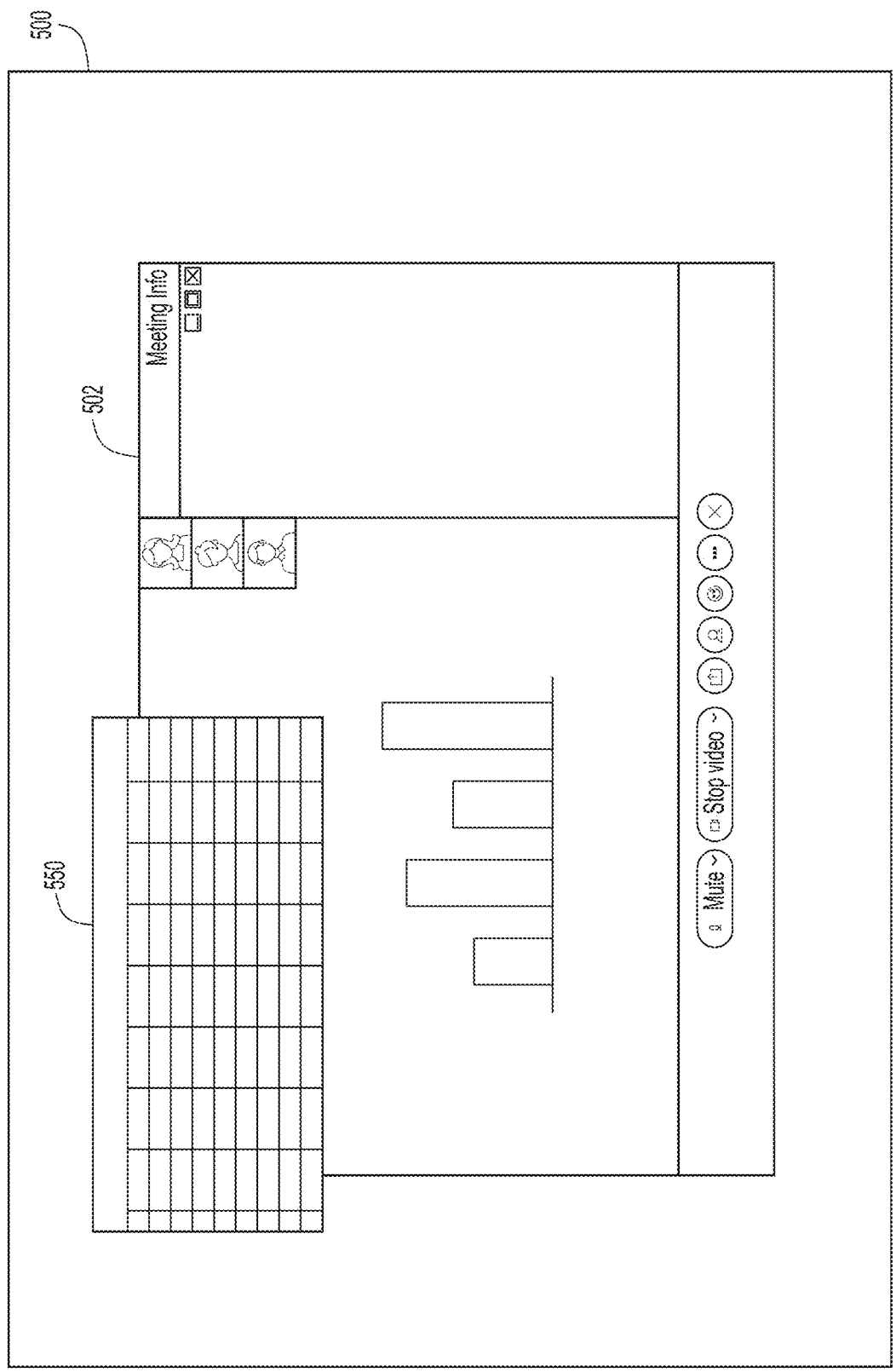
FIG. 5 depicts another user interface for a participant during an online meeting in accordance with an example embodiment and utilizing the system of FIG. 1.

FIG. 4 depicts an example embodiment of a user interface (UI) 402 for the online meeting of the presenter. In the UI 402, the computing device 102 of the participant/presenter has audio button 404 and the video button 406 turned on, which results in a portion 410 of the overall display of the UI 402 showing an image of the presenter. Other participants in the online meeting who have their video buttons turned on are shown as thumbnail image frames 420 within the UI 402. The presenter is further sharing content 430 (e.g., data such as a graph) as part of the presentation. Further buttons or icons can also be provided within the UI 402 to facilitate user selection of other features associated with the online meeting (e.g., emoji buttons to activate during the online meeting, messaging buttons to facilitate instant messaging of one or more other participants of the online meeting, etc.). The computing device for each participant (e.g., participants who are not currently presenting) of the online meeting can have the same or similar layout as the UI 402 of the presenter.

At 320, the meeting server monitors activities of participants in a manner as previously described herein and utilizing the Participant Engagement Detection tool 210 for the meeting module 180 of the meeting server 106. For example, camera displays provided by computing devices 102 of participants (shown as thumbnail image frames 420 in the UIs of the online meeting) can be monitored for face detection and determination of whether participants are looking at their displays or have their heads turned (or not showing in the camera view).

As previously noted, other participant activities that can be monitored by the meeting server, utilizing tool 210, include the active use of one or more software applications by one or more participants during the ongoing online meeting. A desktop display 500 of a computing device 102 for a participant (other than the presenter) of the online meeting is depicted in FIG. 5, including a UI 502 for the online meeting, which is substantially similar in content in relation to the UI 402 of the presenter and includes thumbnail image views of other participants, a view of the presenter, the content provided by the presenter, etc. The participant also has a software application (e.g., a spreadsheet document) that is open and being actively used by the participant as indicated by a display window 550 of the software application being in the foreground and overlapping the UI 502 on the desktop display 500 of the computing device 102. The meeting server 106, utilizing the tool 210, can detect active use of this software application by the participant during the online meeting (e.g., detection of a display window of another application that is overlaying the UI 502 and/or the UI 502 being minimized in the desktop display 500 and/or keystrokes detected and associated with the software application associated with the display window 550) such that this activity by the participant becomes a monitoring event used for determining level of engagement of the participant group for the meeting. Other monitoring events (such as those previously noted herein), in addition to the face detection and active use of other software applications, can also be detected at 320 by the meeting server 106 for purposes of determining overall engagement level of the participant group.

At 330, an idleness score is detected by the meeting server, using the Idleness Scoring tool 220 and based upon the detected monitoring events. As previously noted, an idleness score can be determined for one or a plurality of participants for the online meeting. In particular, when determining individual participant idleness scores, an overall idleness score can be determined, e.g., based upon the average or mean idleness scores determined for individual participants. Alternatively, an overall idleness score can be determined based upon detected monitoring events from all participants that are being monitored within the online meeting. As further previously noted, the overall idleness score is a representation of the collective or overall engagement of the entire group of participants in the online meeting at a given time. As further previously noted, monitoring events can be detected and corresponding idleness scores can be determined at selected time intervals throughout the online meeting (e.g., every 30 seconds, or every 20 seconds, or every 10 seconds, or every 5 seconds, etc.).

Referring to the UI 402 displayed by the computing device 102 of the presenter, the overall idleness score can be displayed in a display window 440 of the UI 402, where the overall idleness score is repeatedly updated and displayed. For example, the idleness score can be provided as a series of values that change over time and are plotted as an X-Y data plot 450 (where Y value is overall idleness score and X value is time) and with any suitable indicia (e.g., "IDLENESS METER") being provided to identify the data plot as representing current idleness score. A constant threshold value can further be plotted in the data plot 450 as a dashed threshold line 460, where the threshold value represents a threshold at which idleness score may be undesirable with regard to level of overall engagement and attentiveness of participants in the online meeting. This provides a visual comparison so that the data plot 450 of current idleness score can readily be compared with the threshold value to see what direction the meeting might be heading in terms of keeping the attention of participants. Thus, a presenter, when provided with this data plot of overall idleness scores vs. time during the online meeting, can attempt to change the overall idleness score for the better by modifying the presentation in some manner and thus potentially preventing the overall idleness score from reaching the threshold value (and also avoiding the use of any interaction element).

The threshold value can be set based upon historical data about prior meetings (obtained, e.g., from the Historical Meeting Information database 230), such as meetings including the same participants (e.g., employees from a specific group or organization in a company, e.g., sales team) or a group of a certain size (e.g., 100 or more participants). Alternatively, or in addition to an initial threshold value being set, the meeting presenter can set or adjust the threshold value (e.g., using a control feature provided in the UI 402) based upon preference of the meeting presenter.

At 340, the current idleness score is compared by the meeting server with the threshold value to determine whether it meets or exceeds the threshold value. If the current idleness score does not meet or exceed the threshold value, the meeting server continues in the process by returning to step 320 and monitoring participant activities to determine monitoring events (so as to update/obtain a current overall idleness score). In the event the idleness score meets or exceeds the threshold value, as shown in the UI 402 of FIG. 6 (data plot 450 extends above dashed threshold line 460), the meeting server 106 recommends at 350 (and utilizing Audience Interaction tool 240) an interaction element for implementation in the online meeting in an effort to change and increase participant engagement (or re-engagement) in the meeting. As previously noted, any suitable interaction element can be implemented to attract participants attention back to the meeting. In the example embodiment depicted in FIGS. 6-8, the interaction element recommended to the meeting presenter (via the UI 402 displayed by the computing device 102 of the presenter) is implemented in the form of a poll to be presented in the online meeting to all participants.

Figure 6:
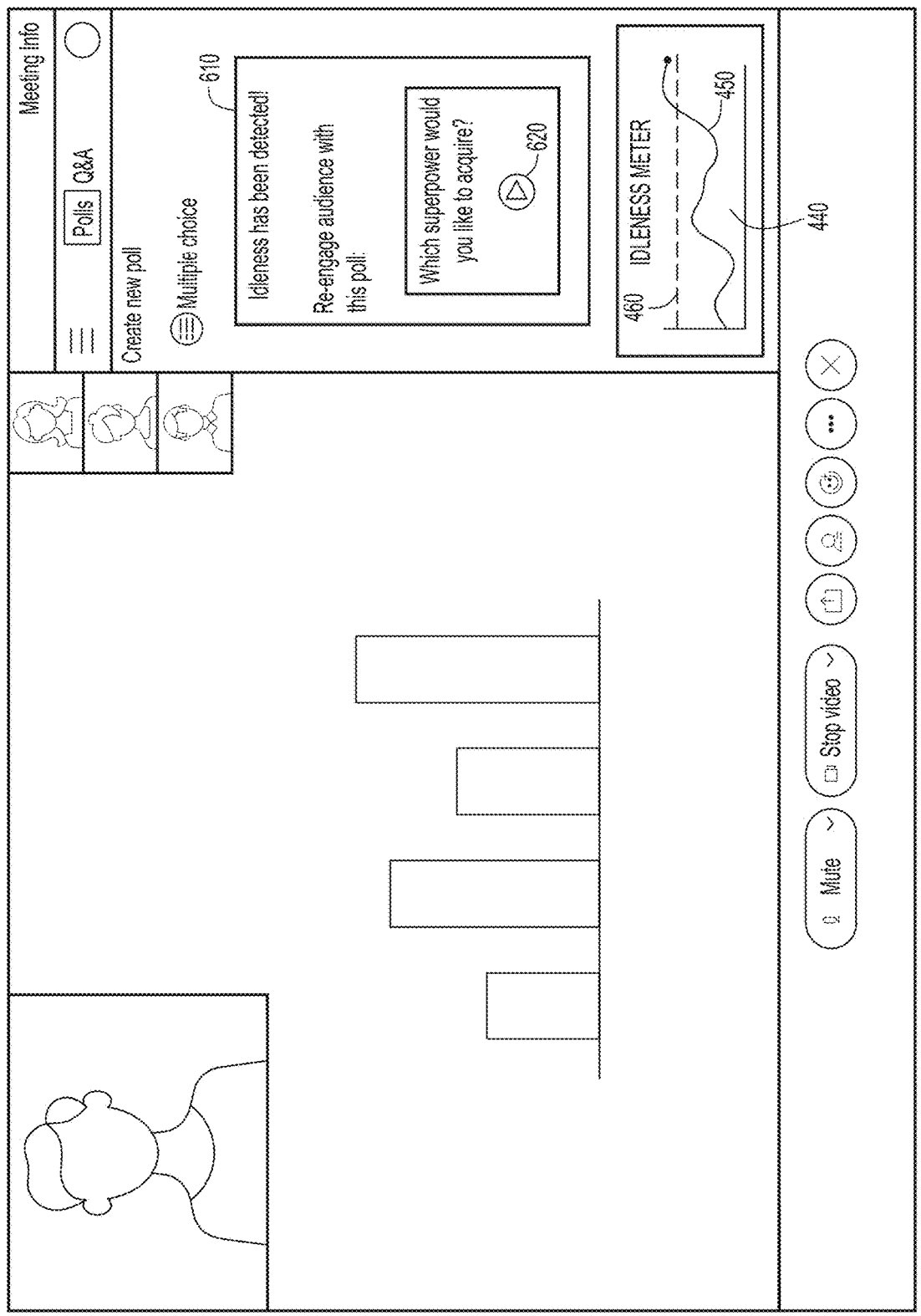
FIG. 6 depicts the user interface of FIG. 4, in which an interaction element (poll) is recommended to the meeting presenter to implement within the online meeting.
Figure 7:
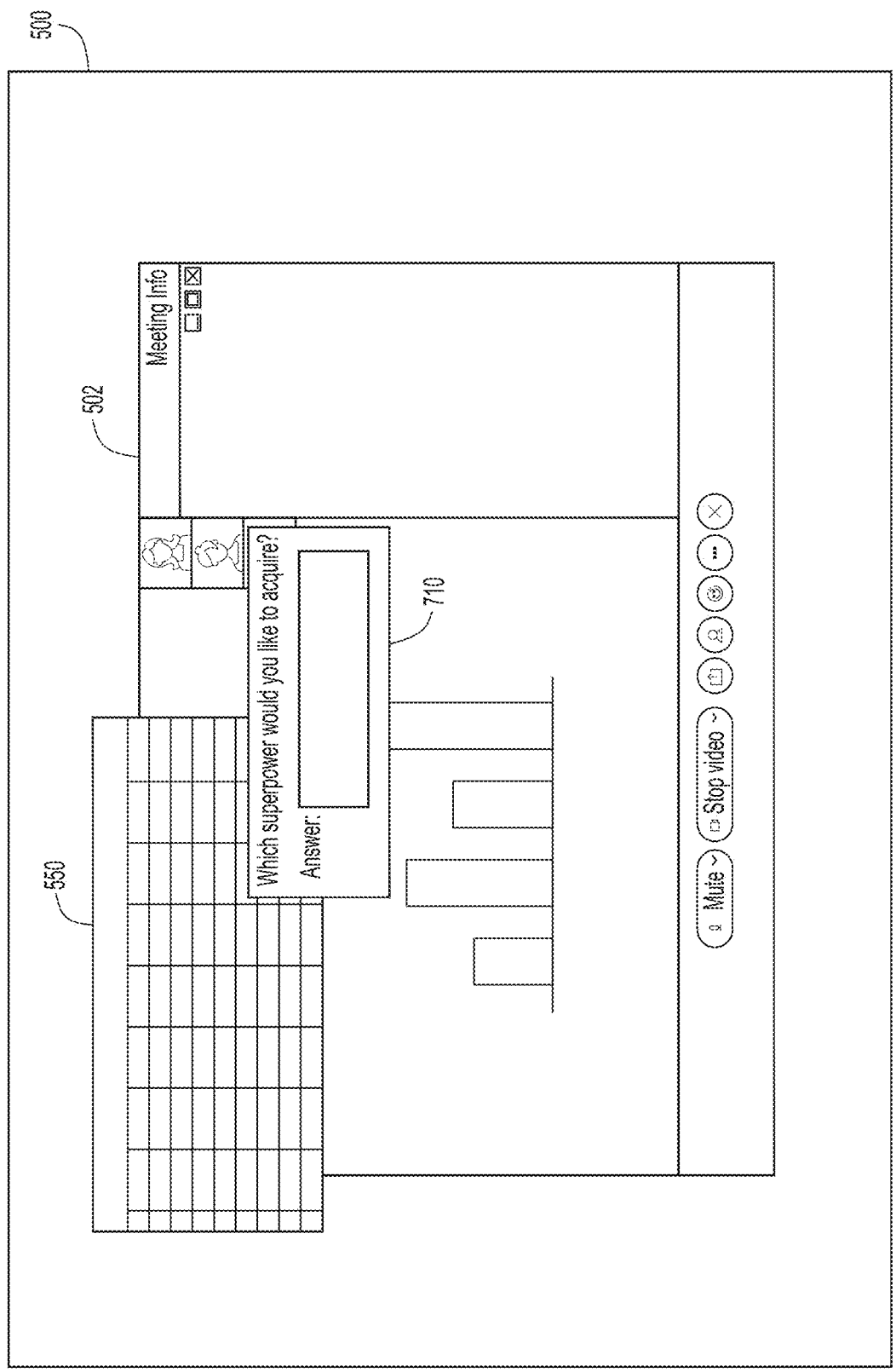
FIG. 7 depicts the user interface of FIG. 5 for the participant of the online meeting, including the presented interaction element (poll).
Figure 8:
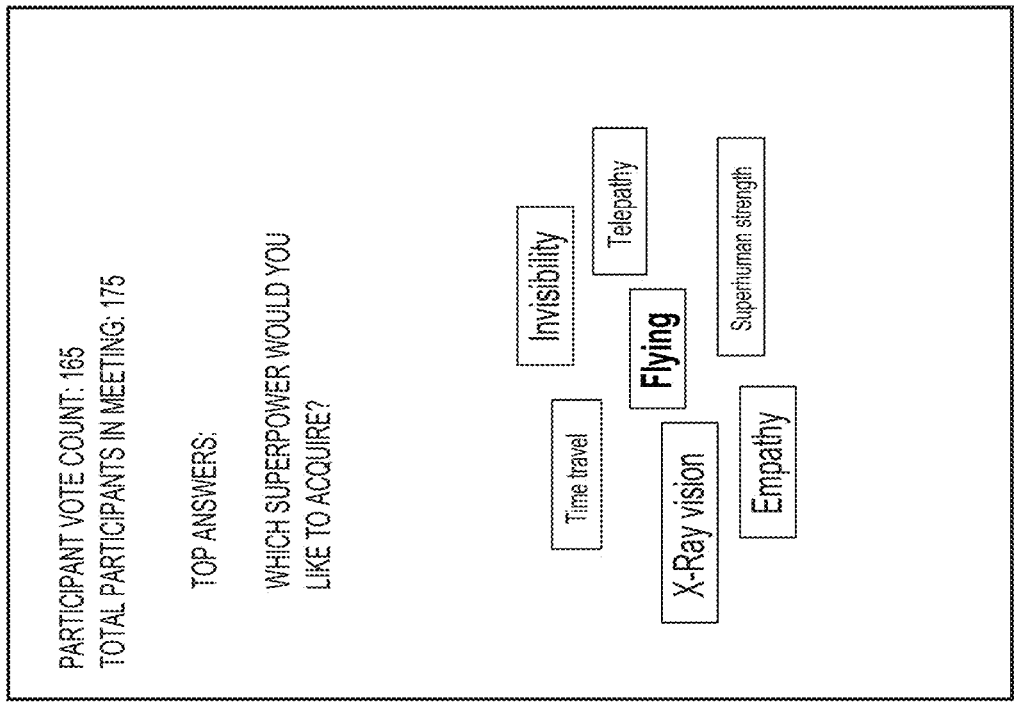
FIG. 8 depicts a display window for the user interface of FIG. 4 for the meeting presenter, showing results of the poll submitted to and taken by participants attending the online meeting.

As depicted in FIG. 6, a display window 610 can be provided by the meeting server 106 in the UI 402 of the meeting presenter that provides a notification that the idleness score meets or exceeds the threshold ("Idleness has been detected!"). In the display window 610, a recommendation is further provided to re-engage the audience of participants by presenting a poll with one or more questions (e.g., "Which superpower would you like to acquire?"). As previously noted, the poll can be the same or similar poll that has been previously provided in other similar meetings (where similar meetings can be of the same or similar content type and/or include the same or similar participants) and achieved success (e.g., reduced the overall idleness score to a desired level below the threshold value). The presenter can select to implement the poll, e.g., by clicking on the select button 620 within the display window 610. Referring to FIG. 7, selection of the poll by the meeting presenter can result in the poll being implemented and display as one or a series of questions at the UI 502 of the computing device 102 for each participant. For example, a pop-up display window 710 can be presented in the foreground of the display 500 at the computing device 102 of each participant (e.g., the display window 710 is in foreground of the UI 502 as well the display window of any other software application (e.g., display window 550) that may be open at the desktop display of each participant). The display window 710 can include the poll question(s) and an answer box configured to receive a text box to receive an answer input from the participant. As depicted in FIG. 8, the presenter can be provided, as a display window 810 within the UI 402, information about the results/answers by participants of the poll. Information such as number of participants that responded to the poll (e.g., displayed as a vote count, e.g., number of responding participants vs. number of total participants, such as is shown in FIG. 8 as "Participant Vote Count: 165" and "Total Participants in Meeting: 175"), a sampling of answers given (e.g., the most common answers), and any other information associated with the poll can be provided in the display window 810.

After the poll has been completed and the results provided/displayed to the presenter, the presenter can be provided with the option of removing the display window 810 from the UI 402. The meeting server can save the poll information in combination with information about the meeting (e.g., meeting size/number of participants, specific meeting participants, specific topic of the meeting which can be obtained, etc.). The process then returns again to step 320, where participant activities during the meeting are monitored and monitoring events are determined (for purposes of determining or updating to a new and current overall idleness score). The process depicted in FIG. 3 is performed continuously by the meeting server until the online meeting has ended.

Figure 9:
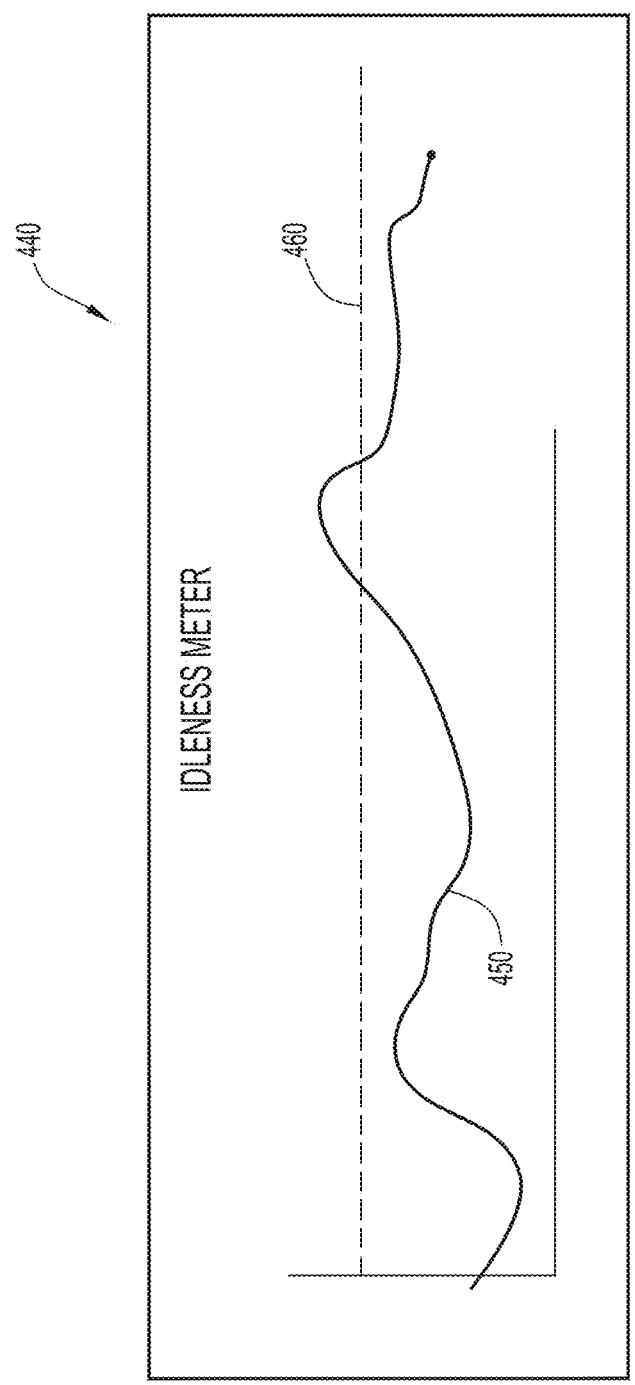
FIG. 9 depicts a display window for the user interface of FIG. 4 that provides a plot of idleness score representing participant engagement in the online meeting and how it changes in time during the meeting.

After the poll (or other interaction element) has been implemented and a new, updated and current overall idleness score has been determined, the current overall idleness score can be associated or linked with the poll information and saved in the Historical Meeting Information database 230. In the example embodiment depicted in FIG. 9, the overall idleness score represented by the data plot 450 trends downward and below the dashed threshold line 460, indicating that the result of the poll was a success in increasing engagement or re-engagement of participants back to the meeting.

Thus, the systems and methods described herein facilitate a current and continuously updated understanding of how well the entire participant audience is engaged with an online meeting and further provides an effective mechanism in the implementation of an interaction element to steer or guide participants attention for increased engagement or re-engagement back to a meeting when it is determined that participant engagement is low. In the embodiments described herein, a constant monitoring and reporting of idleness score (e.g., via a graph or curve showing via an idleness meter) also allows the presenter to make changes or revisions to a presentation in real time and "on-the-fly" in an effort to increase participant engagement if the idleness score is trending in an undesired manner. The interaction element(s) that are recommended and/or presented by the meeting server can further be targeted for the participant audience of a current online meeting based upon historical information from previous meetings in which idleness scores were tracked and interaction elements implemented (e.g., based upon same group of participants, same type of meeting content, same size of meeting/number of participants, etc. when comparing current meeting to previous meetings). The end result is enhancing meeting effectiveness by keeping participants focused and engaged in meeting content throughout the meeting.

Figure 10:
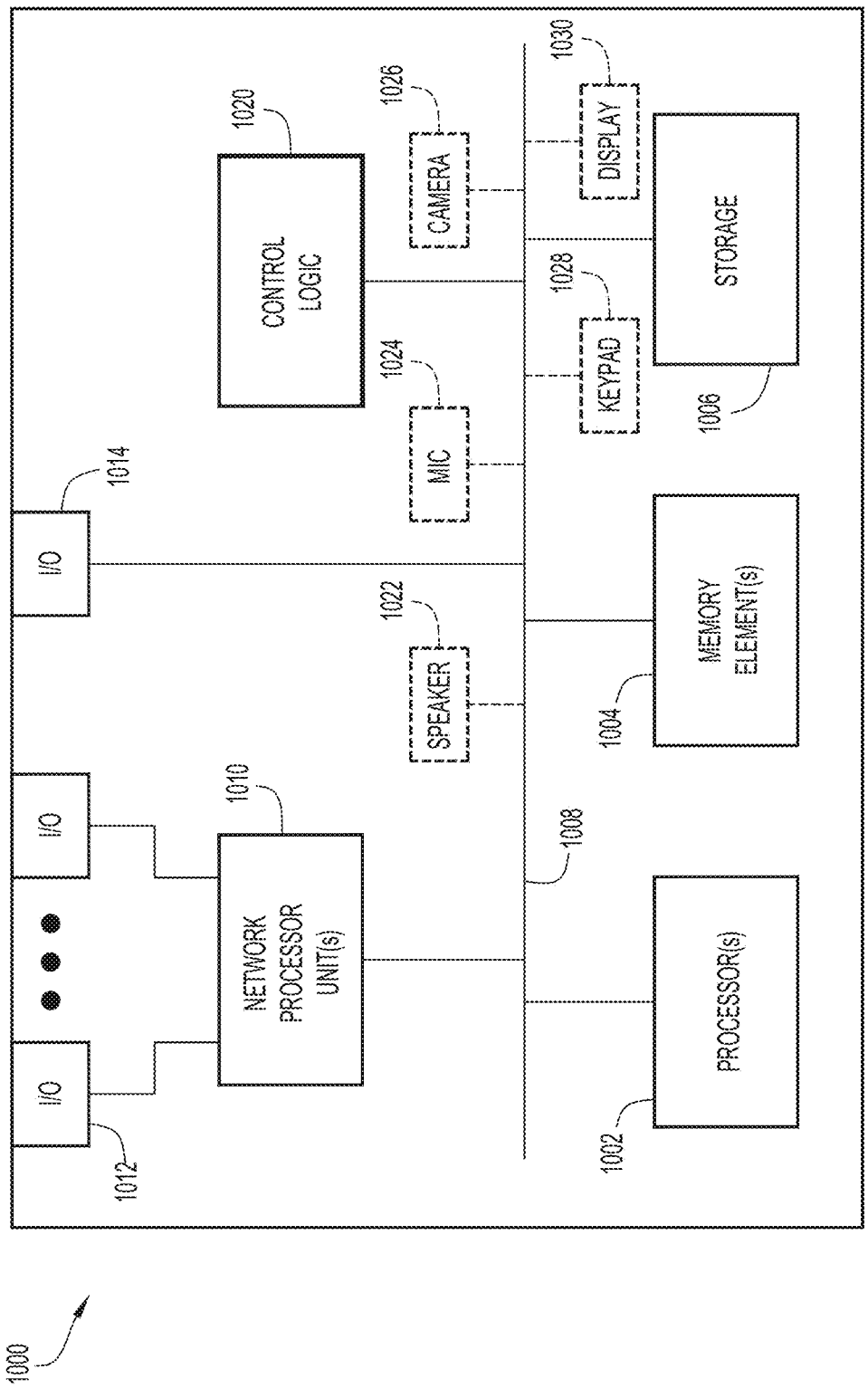
FIG. 10 illustrates an example embodiment of a hardware block diagram of a computing device configured to perform functions associated with determining level of engagement of participants in an online meeting and suggesting or implementing an interaction element for participants during the online meeting.

A hardware block diagram of a computing device 1000 is depicted in FIG. 10, where the computing device 1000 can be implemented as any of the computing devices 102 of participants in the online meeting as well as the meeting server 106. The computing device 1000 is configured to perform functions associated with operations discussed herein in connection with the systems and methods depicted in FIGS. 1-9. In various embodiments, a computing device, apparatus, or system, such as computing device 1000 or any combination of computing devices 1000, may be configured as any entity/entities (e.g., computer devices, meeting server device(s) and/or other server systems, endpoint devices, etc.) as discussed for the methods depicted in connection with FIGS. 1-9 in order to perform operations of the various techniques discussed herein.

In at least one embodiment, computing device 1000 may be any apparatus that may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 0114, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory elements 1004 (or vice versa) or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or network I/O interfaces 1012 may include suitable interfaces for receiving, transmitting, and/or otherwise communicating data and/or information in a network environment.

I/O interface(s) 1014 allow for input and output of data and/or information with other entities that may be connected to computing device 1000. For example, I/O interface(s) 1014 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device, endpoint device, etc.), computing device 1000 may further include, or be coupled to, an audio speaker 1022 to convey sound, microphone or other sound sensing device 1024, camera or image capture device 1026, a keypad or keyboard 1028 to enter information (e.g., alphanumeric information, etc.), and/or a touch screen or other display 1030. These items may be coupled to bus 1008 or I/O interface(s) 1014 to transfer data with other elements of computing device 1000.

In various embodiments, control logic 1020 can include instructions that, when executed, cause processor(s) 1002 to perform operations, which can include, but not be limited to, providing overall control operations of computing device 1000; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Present embodiments may provide various technical and other advantages. In an embodiment, the methods implemented by systems described herein provide current and accurate information about audience participation in an online meeting, which can result in more effective and efficient meetings that ensure appropriate meeting information is being conveyed to participants (by maintaining or re-engaging participants attention in the meeting).

The programs and software described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments (e.g., meeting modules 150 of computing devices, meeting module 180 of meeting server, and various tools associated with meeting modules, etc.) may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the device elements described herein may couple to and/or interact with one another through interfaces and/or through any other suitable connection (wired or wireless) that provides a viable pathway for communications. Interconnections, interfaces, and variations thereof discussed herein may be utilized to provide connections among device elements in a system and/or may be utilized to provide communications, interactions, operations, etc. among device elements that may be directly or indirectly connected in the system. Any combination of interfaces can be provided for device elements described herein in order to facilitate operations as discussed for various embodiments described herein.

In various embodiments, any entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory elements 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, modules, components, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, server, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: monitoring activities of participants attending an online meeting, determining an overall level of participant engagement of the participants during the online meeting, and, in response to a determination that the overall level of participant engagement is at or beyond a threshold, facilitating an interaction element to be introduced for all participants in the online meeting.

In another form, an apparatus is provided. The apparatus comprises: a memory configured to store instructions including one or more applications that facilitates operations of an online meeting in which participants at different computing devices connect with and attend the online meeting. The apparatus further comprises a processor configured to execute and control operations of the one or more applications so as to monitor activities of participants attending the online meeting, determine an overall level of participant engagement of the participants during the online meeting, and, in response to a determination that the overall level of participant engagement is at or beyond a threshold, facilitate an interaction element to be introduced for all participants in the online meeting.

In a further form, one or more computer readable storage media is/are provided. The one or more computer readable storage media are encoded with software comprising computer executable instructions and when the software is executed are operable to monitor activities of participants attending an online meeting, determine an overall idleness score representing an overall level of participant engagement of the participants during the online meeting, the overall idleness score being based upon the monitoring of activities of participants, and, in response to a determination that the overall level of participant engagement is at or beyond a threshold, facilitate an interaction element to be introduced for all participants in the online meeting.

For the method form, the determining the overall level of participant engagement can comprise determining an overall idleness score based upon the monitoring activities of participants.

For each form, the monitoring of activities can comprise at least one selected from the group consisting of monitoring a video feed from a camera of a computing device for a participant and utilizing facial detection software to determine whether the participant is staring at a display of the online meeting by the computing device, monitoring whether the participant is communicating via the computing device of the participant with another participant or with someone other than another participant during the online meeting, and monitoring whether the participant is actively using a software application other than a meeting application associated with the online meeting on the computing device of the participant.

For each form, the determining the overall idleness score can comprise determining a plurality of individual participant idleness scores for a plurality of participants attending the online meeting, and further determining the overall idleness score as a single score based upon the plurality of individual participant idleness scores. The plurality of participants from which the individual participant idleness scores are determined can also be less than a total number of participants attending the online meeting.

For each form, the monitoring activities of participants during the online meeting and the determining the overall idleness score can be performed periodically throughout the online meeting, and the form can further comprise displaying a plot of idleness scores over time during the online meeting for a presenter of the meeting.

For each form, the facilitating the interaction element to be introduced for all participants in the online meeting can comprise recommending implementation of a poll to all participants attending the online meeting, where the poll comprises a question to be answered by participants attending the online meeting. Each form can further comprise implementing the poll to all participants attending the online meeting in response to a presenter of the online meeting selecting the poll to be implemented. A result of the poll can further be displayed to the presenter, including a display of answers by participants attending the online meeting and number of participants that attended the online meeting.

For each form, the facilitating the interaction element to be introduced for all participants in the online meeting can comprise selecting the interaction element based upon historical information from a previous meeting in which a previous interaction element was implemented and resulted in increasing overall level of participant engagement in the previous meeting.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
monitoring activities of a subset of participants attending an online meeting, wherein the subset of participants is associated with historical idleness scores that are higher than an average idleness score associated with the online meeting;
determining an overall level of participant engagement of the subset of participants during the online meeting, wherein the overall level of participant engagement is represented by a single score obtained from a plurality of individual participant idleness scores associated with the subset of participants; and
in response to a determination that the overall level of participant engagement is at or beyond a threshold, facilitating an interaction element to be introduced for all participants in the online meeting.

2. The method of claim 1, wherein determining the overall level of participant engagement comprises:
determining the plurality of individual participant idleness scores based upon the monitoring of activities of the subset of participants.

3. The method of claim 2, wherein the monitoring of activities comprises at least one selected from the group consisting of:
monitoring a video feed from a camera of a computing device for a participant and utilizing facial detection software to determine whether the participant is staring at a display of the online meeting by the computing device;
monitoring whether the participant is communicating via the computing device of the participant with another participant or with someone other than another participant during the online meeting; and
monitoring whether the participant is actively using a software application other than a meeting application associated with the online meeting on the computing device of the participant.

4. The method of claim 2, wherein the determining the overall level of participant engagement comprises:
determining the single score based on an average or a mean of the plurality of individual participant idleness scores.

5. The method of claim 2, wherein the monitoring activities of the subset of participants during the online meeting and the determining the overall level of participant engagement are performed periodically throughout the online meeting, and the method further comprises:
displaying a plot of idleness scores over time during the online meeting for a presenter of the online meeting.

6. The method of claim 1, wherein the facilitating the interaction element to be introduced for all participants in the online meeting comprises:
recommending implementation of a poll to all participants attending the online meeting, wherein the poll comprises a question to be answered by participants attending the online meeting.

7. The method of claim 6, further comprising:
implementing the poll to all participants attending the online meeting in response to a presenter of the online meeting selecting the poll to be implemented; and
displaying a result of the poll to the presenter, including a display of answers by participants attending the online meeting and number of participants that attended the online meeting.

8. The method of claim 1, wherein the facilitating the interaction element to be introduced for all participants in the online meeting comprises:
selecting the interaction element based upon historical information from a previous meeting in which a previous interaction element was implemented and resulted in increasing overall level of participant engagement in the previous meeting.

9. An apparatus comprising:
a memory configured to store instructions including one or more applications that facilitates operations of an online meeting in which participants at different computing devices connect with and attend the online meeting; and
a processor configured to execute and control operations of the one or more applications so as to:
monitor activities of a subset of participants attending the online meeting, wherein the subset of participants is associated with historical idleness scores that are higher than an average idleness score associated with the online meeting;
determine an overall level of participant engagement of the subset of participants during the online meeting, wherein the overall level of participant engagement is represented by a single score obtained from a plurality of individual participant idleness scores associated with the subset of participants; and
in response to a determination that the overall level of participant engagement is at or beyond a threshold, facilitate an interaction element to be introduced for all participants in the online meeting.

10. The apparatus of claim 9, wherein the processor determines the overall level of participant engagement by:
determining the plurality of individual participant idleness scores based upon the monitoring activities of the subset of participants.

11. The apparatus of claim 10, wherein the processor monitors activities selected from one or more of:
monitoring a video feed from a camera of a computing device for a participant and utilizing facial detection software to determine whether the participant is staring at a display of the online meeting by the computing device;
monitoring whether the participant is communicating via the computing device of the participant with another participant or with someone other than another participant during the online meeting; and
monitoring whether the participant is actively using a software application other than a meeting application associated with the online meeting on the computing device of the participant.

12. The apparatus of claim 10, wherein the processor determines the overall level of participant engagement by:
determining the single score based on an average or a mean of the plurality of individual participant idleness scores.

13. The apparatus of claim 10, wherein the monitoring activities of the subset of participants during the online meeting and the determining the overall level of participant engagement are performed by the processor periodically throughout the online meeting, and the processor is further configured to execute and control operations of the one or more applications so as to:

display a plot of idleness scores over time during the online meeting for a presenter of the online meeting.

14. The apparatus of claim 9, wherein the processor facilitates the interaction element to be introduced for all participants in the online meeting by:
recommending implementation of a poll to all participants attending the online meeting, wherein the poll comprises a question to be answered by participants attending the online meeting.

15. One or more non-transitory computer readable storage media encoded with software comprising computer executable instructions and when the software is executed operable to:
monitor activities of a subset of participants attending an online meeting, wherein the subset of participants is associated with historical idleness scores that are higher than an average idleness score associated with the online meeting;
determine an overall idleness score representing an overall level of participant engagement of the subset of participants during the online meeting, the overall idleness score being based upon the monitoring of activities of participants, wherein the overall level of participant engagement is represented by a single score obtained from a plurality of individual participant idleness scores associated with the subset of participants; and
in response to a determination that the overall level of participant engagement is at or beyond a threshold, facilitate an interaction element to be introduced for all participants in the online meeting.

16. The one or more non-transitory computer readable storage media of claim 15, wherein the instructions are operable to monitor activities comprising at least one selected from the group consisting of:
monitoring a video feed from a camera of a computing device for a participant and utilizing facial detection software to determine whether the participant is staring at a display of the online meeting by the computing device;
monitoring whether the participant is communicating via the computing device of the participant with another participant or with someone other than another participant during the online meeting; and
monitoring whether the participant is actively using a software application other than a meeting application associated with the online meeting on the computing device of the participant.

17. The one or more non-transitory computer readable storage media of claim 15, wherein the instructions are operable to determine the overall idleness score by:
determining the single score based on an average or a mean of the plurality of individual participant idleness scores.

18. The one or more non-transitory computer readable storage media of claim 15, wherein the instructions are operable to monitor activities of participants during the online meeting and determine the overall idleness score periodically throughout the online meeting, and the instructions are further operable to:
display a plot of idleness scores over time during the online meeting for a presenter of the online meeting.

19. The one or more non-transitory computer readable storage media of claim 15, wherein the instructions are operable to facilitate the interaction element to be introduced for all participants in the online meeting by:
recommending implementation of a poll to all participants attending the online meeting, wherein the poll comprises a question to be answered by participants attending the online meeting.

20. The method of claim 1, wherein the facilitating the interaction element to be introduced for all participants in the online meeting comprises:
providing an indication of a break in the online meeting until the overall level of participant engagement reaches the threshold.

21. The method of claim 1, wherein the threshold is determined based on historical data associated with one or more previous meetings attended by the participants or by a predetermined number of participants.

22. The method of claim 1, wherein the historical idleness scores are obtained from historical meeting information associated with one or more previous meetings attended by the subset of participants.

* * * * *